March 21, 1950          L. D. COOK, JR          2,501,562
PROCESS FOR POLYMERIZING STYRENE IN THE PRESENCE OF
A POLYVINYL ALCOHOL-ALKYL ALDEHYDE REACTION PRODUCT
Filed Dec. 6, 1945          2 Sheets-Sheet 1

INVENTOR
LEON DAVID COOK JR.
BY Richard C. Lindberg
ATTORNEY

Patented Mar. 21, 1950

2,501,562

UNITED STATES PATENT OFFICE 2,501,562

PROCESS FOR POLYMERIZING STYRENE IN THE PRESENCE OF A POLYVINYL ALCOHOL-ALKYL ALDEHYDE REACTION PRODUCT

Leon David Cook, Jr., Chicago, Ill., assignor to International Detrola Corporation, Detroit, Mich., a corporation of Indiana Application December 6, 1945, Serial No. 633,060

5 Claims. (Cl. 260—45.5)

This invention relates to a modified styrene resin and to a process for preparing same, particularly to plasticized modified styrene resin compounds suitable for casting and impregnating applications in the field of electrical insulation.

Polymerized styrene is well known as a very hard and brittle resin having excellent di-electric properties, which remain virtually unchanged in the presence of moisture. However, the resistance of polymerized styrene to thermal and mechanical shock is very poor, and its use in the unmodified form as an insulating material is limited to those applications where it is not exposed to such types of shock. On the other hand, a plasticized polystyrene having elastic and resilient properties would be well adapted to applications where thermal and mechanical shock are present. It is known in the art, however, that the polymer does not plasticize well in the presence of most plasticizing oils and liquids. Obviously, then, a plasticized styrene compound having elastic and resilient properties cannot be formed by the ordinary processes of polymerization in the presence of the known plasticizing oils.

Attempts to employ plasticized styrene as an electrical insulating coating for metallic conductors as in coils, condensers, or other electrical circuit components has not only resulted in products of poor mechanical strength as far as the insulation by itself is concerned, but frequently in corrosion of the metal by the insulation. This is the case where polystyrene is plasticized with high boiling oils and organic liquids or solids, particularly those employing unsaturated oils, acids, esters, and aldehydes as co-polymers or as admixtures. Another factor causing corrosion of the coated metal is the employment of accelerators or catalysts to increase the rate of polymerization. Acids, bases or salts, sulphur compounds or peroxides have commonly been employed, all of which have a definite reaction on metal to cause corrosion thereof and thereby reduce the effectiveness of the material as an insulator.

There are a number of synthetic resins having good di-electric and insulating properties which may be conveniently plasticized with high boiling organic liquids to a consistency closely approximating natural rubber for elasticity and toughness. These resins are quite resistant to thermal and mechanical shock. The resinous products resulting from the reaction of a polyvinyl alcohol with alkyl aldehydes, such as polyvinyl formal, polyvinyl butyral, and polyvinyl acetal are examples of such resins.

In adapting polymerized styrene to a more useful form for insulation applications, so that it will have resistance to thermal and mechanical shock, some of the desirable characteristics of the products of reaction between polyvinyl alcohol and alkyl aldehydes are imparted to the polystyrene compound. This may be accomplished, for example, by adding to a liquid monomeric styrene, granular polyvinyl butyral in the presence of a liquid plasticizer in such a fashion as to overcome the disadvantages inherent in plasticized styrene compounds referred to above.

It is an object of this invention to provide a single liquid product resulting from a process employing a unique principle based on a series of viscosity differentials occurring during the process, which product may be further treated to obtain an end product having certain desirable characteristics.

It is a further object of this invention to provide a single liquid product suitable for electrical insulation which may be cast or otherwise fabricated and further polymerized to a thermo-plastic solid. The product consists of a solution of the reaction product of polyvinyl alcohol and an alkyl aldehyde in monomeric styrene, and a plasticizing oil, which liquid product may be treated to partially polymerize the styrene intermixed with the reaction product of polyvinyl alcohol and an alkyl aldehyde to yield a mixture of the reaction product of polyvinyl alcohol and an alkyl aldehyde and styrene polymer in styrene monomer and plasticizer, which upon final polymerization of the residual styrene monomer will result in homogeneous solid solution of unique and desirable physical properties for insulation.

A yet further object is to provide a process for the treatment of monomeric styrene with the reaction product of polyvinyl alcohol and an alkyl aldehyde in the presence of plasticizing oils to give a product having unique and desirable properties for electrical insulation.

Another object is to provide a liquid material of suitable viscosity and wetting characteristics, the function of which is to fill the interstices, voids, and spaces of windings, coils, or the like with insulation.

In the drawings which illustrate phenomena occurring during the process forming a part of this invention to achieve the products forming another part of this invention:

Figure 1:
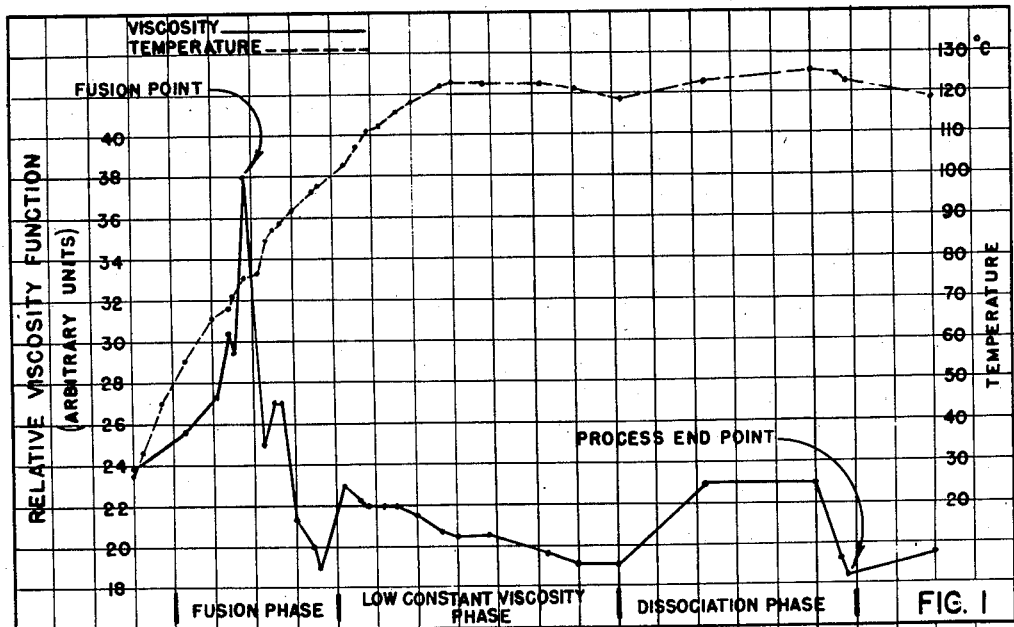
Figure 1 shows the change in relative viscosity during the time and temperature period of the process where styrene monomer is treated with a certain percentage of a reaction product between polyvinyl alcohol and an alkyl aldehyde.
Figure 3:
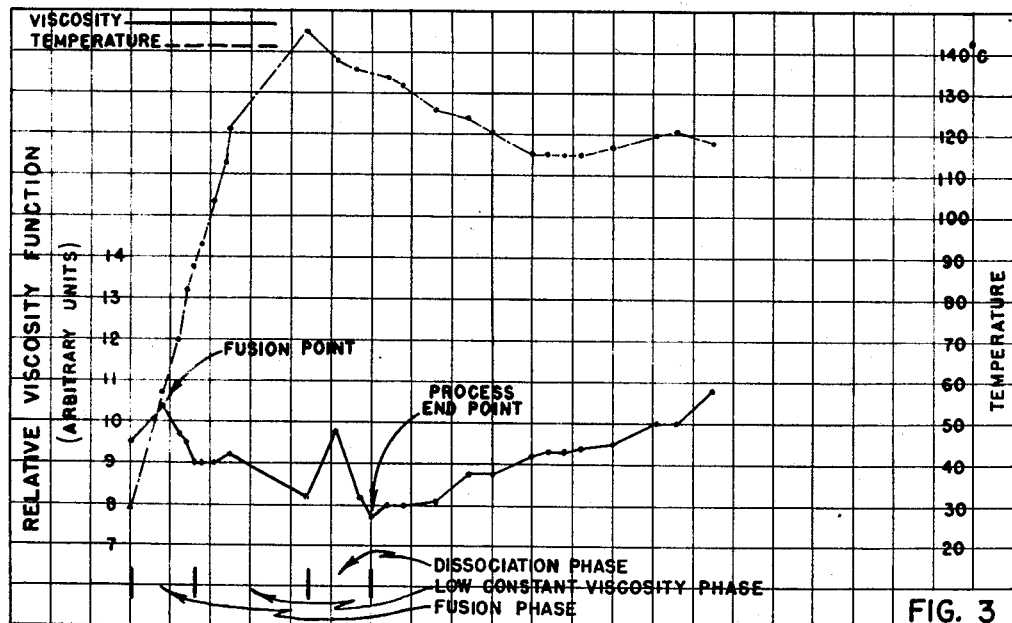
Figure 4:
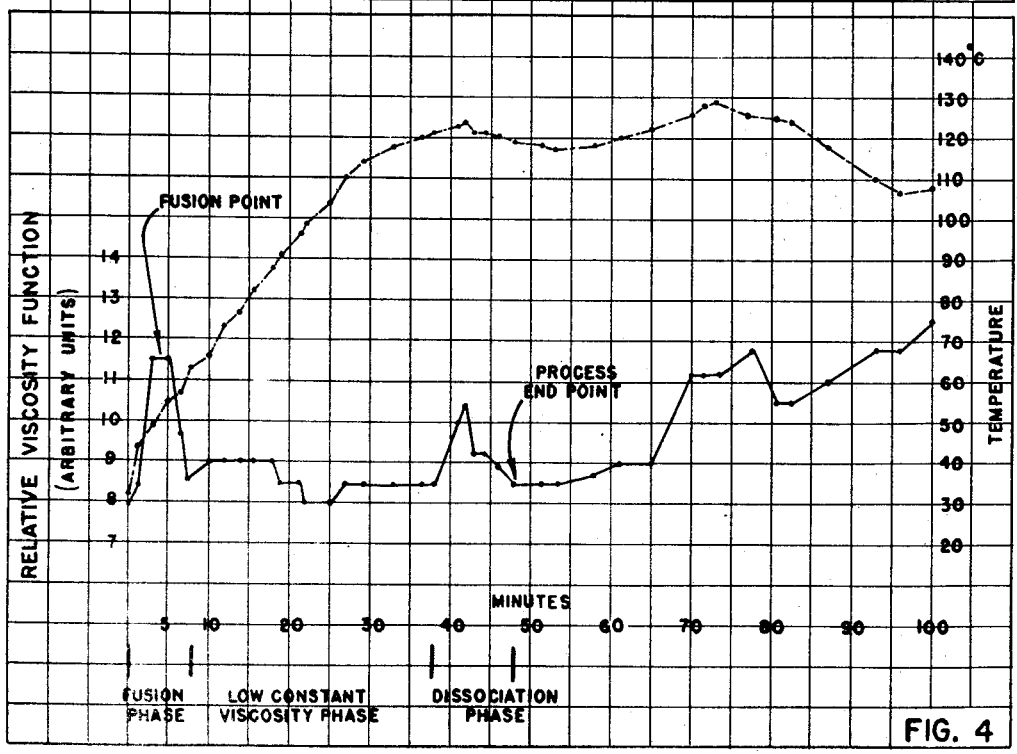

Figure 3 shows the phenomena obtaining where a lower percentage of a reaction product between polyvinyl alcohol and an alkyl aldehyde is present with styrene, the percentage of the reaction product being less than that of Figure 1; and Figure 4 shows the phenomena taking place during the process where styrene monomer is treated with a certain percentage of a reaction product between polyvinyl alcohol and a different alkyl aldehyde from that of Figure 1.

Referring now to Figure 1 and to the following composition which is illustrated by Figure 1, the invention may be carried out in practice as follows:

*Example 1*

120 parts by weight of styrene monomer (99% or better of monomer)
12 parts by weight granular polyvinyl butyral
12 parts by weight polyethylene glycol di-2-ethyl hexoate.

These materials were added together, all the while being agitated and heated. The viscosity of the above mixture passed through several phases, the initial mixture being a granular rubbery semi-gel at room temperature which increased in viscosity as the temperature of the entire mass was increased. Between 75° C. and 80° C. a condition of maximum viscosity occurred, during which period the entire mass changed from a heterogeneous mixture in which the polyvinyl butyral was suspended in the styrene monomer, the plasticizer at this time causing the polyvinyl butyral to swell, and the styrene monomer appearing to be held by the swollen polyvinyl butyral much as a sponge holds water, to a homogeneous mass in which the constituents were no longer evident as entities by themselves. This temperature range may be termed the fusion range of temperatures. The temperature of the mixture was then raised, all the while vigorous mixing being continued, to between 90° C. to 145° C., temperatures of 115° C. to 120° C. being most desirable, and held at said temperatures from 30 to 180 minutes. When the desired temperatures of 115° C. to 120° C. were reached, which range of temperatures will be referred to as the processing temperatures, the entire mixture reached a low substantially constant viscosity phase. This phase began almost immediately after the termination of the fusion phase, and continued for approximately 35 minutes, as will be apparent by reference to Figure 1. The low substantially constant viscosity phase prevailed until a certain concentration of styrene polymer was reached, at which time the mixture entered a second relatively higher viscous phase, which may be termed the dissociation phase, as will be apparent from Figure 1. The dissociation phase became readily apparent about 10 minutes after the end of the low substantially constant viscosity phase and continued for approximately 15 minutes at which time the viscosity dropped rapidly to a minimum, at which point the process was terminated. During the dissociation phase the material became opaque instead of transparent as initially.

Upon cooling of the materials to room temperature the consistency was that of a thin syrup. However, prior to this elapsed time period, a sample withdrawn from the mixture reverted to a tough rubberlike gel at room temperature and it may be emphasized that the desired liquid properties of this material combination seem to be obtainable within the time and temperature ranges of the process heretofore described, and only after the termination of the viscous dissociation phase. The exact chemical reason underlying this phenomenon is not exactly known, but it may be assumed that at this point the individual alkyl polymers are completely dissociated from the original mass so that cohesion between them is now negligible and that complete solution in the styrene monomer has taken place.

Further polymerization of the mixture resulting from the above process will give a thermoplastic solid having excellent di-electric properties and very high resistance to mechanical shock. It is believed that the presence of the liquid plasticizer is instrumental in achieving the desirable results referred to and it is believed that the thermoplastic solid obtained with the mixture in the process of further polymerization results in a mixture of the reaction product between polyvinyl alcohol and an alkyl aldehyde in a matrix of polymerized styrene, together with the liquid plasticizer to form a homogeneous mass. In the process described hereinbefore, the essential function of the time and temperature in relation to the liquid end product, will be more fully understood with reference to Figure 1, wherein the left ordinate represents relative viscosity, the right ordinate temperature, and time is plotted on the abscissa. It will be observed that a great relative change in viscosity takes place during the early period in the process, at which time the mixture changes from a heterogeneous one to a homogeneous mass, which period is termed the fusion phase.

The process heretofore described may be varied within certain concentration limits of the reaction product of polyvinyl alcohol and an alkyl aldehyde and of plasticizer, and according to the ratio of each to styrene monomer and according to the ratio of the reaction product of polyvinyl alcohol and the alkyl aldehyde to plasticizer. The mixture described above may thus be desirably varied in proportion to give stiffer or harder, or softer and more pliable products according to the following: styrene to the reaction product of polyvinyl alcohol and an alkyl aldehyde, from 100 to 1, to 100 to 18 parts by weight; liquid plasticizer to the reaction product of polyvinyl alcohol and an alkyl aldehyde, from 7 to 10 to 2 to 1 parts by weight.

Figure 2:
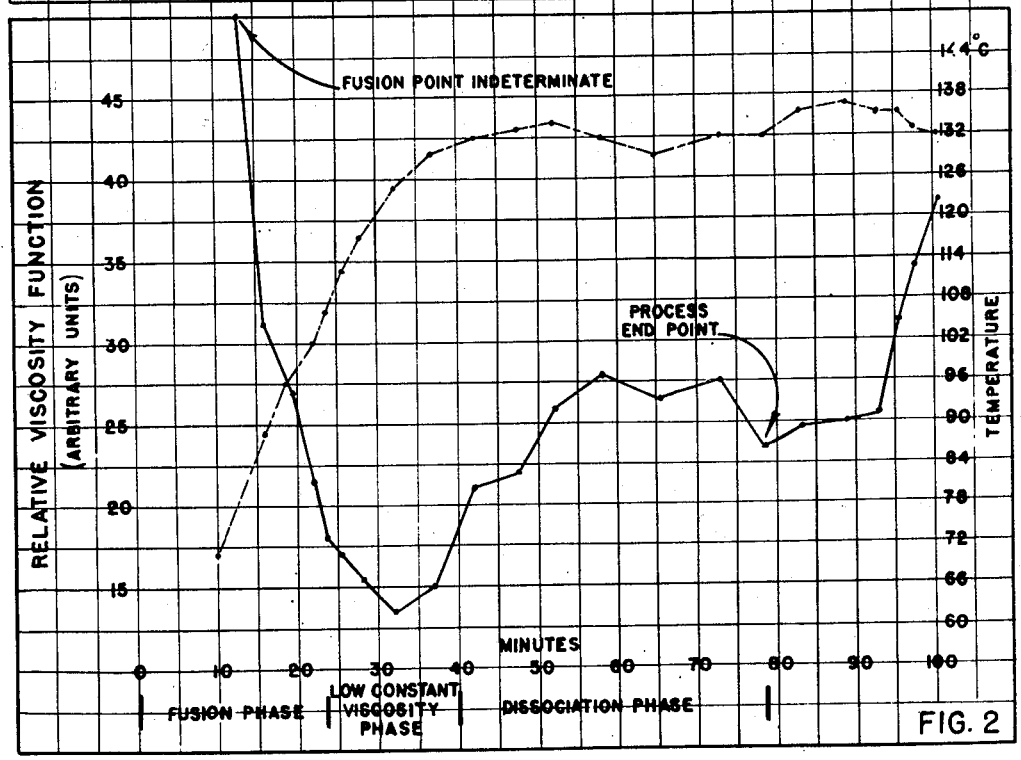
Figure 2 shows the phenomena obtaining where styrene monomer is treated with the reaction product, where the percentage of the reaction product is greater than that shown in Figure 1.

A more detailed effect of concentration variation on the process and the end product will be more fully understood with reference to Figures 2, 3 and 4, and with reference to the examples following, wherein in Figures 2, 3 and 4, viscosity data is correlated for low resin concentration (polyvinyl alcohol and alkyl aldehyde reaction product) and high resin concentration, and for intermediate concentration of resin where the resin is the reaction product between polyvinyl alcohol and acetaldehyde.

*Example 2*

100 parts styrene (99% or better)
18 parts polyvinyl butyral
18 parts plasticizer (polyalkene glycol or polyethylene glycol di-2-ethyl hexoate).

Referring to Figure 2 of the drawings there is shown the phenomena occurring during the process according to Example 2. Initial mixture of the constituents gives a relative viscosity not possible of measurement by ordinary methods, which relative viscosity rapidly drops as the processing temperature is reached to give the low substantially constant viscosity phase. This phase lasts for a relatively short time, when the viscosity of the mixture gradually increases, termed the dissociation phase, until the end point is reached, when the viscosity decreases.

The above composition when processed at substantially the time and temperatures stated in connection with Example 1 will yield a viscous but liquid product that may be cast or vacuum impregnated. However, the liquid material, compared to that by Example 1, is more viscous, but upon further polymerization gives a product which yields easily under stress, is extensible and plastic, and most resistant to shattering from impact. Furthermore, the cast fully polymerized product does not develop internal stresses resulting in warping, cracking or other deformation as in the case of unmodified polymerized styrene. Where the nature of application permits or demands the end product according to Example 2 provides exceedingly flexible insulation.

A desirable minimum concentration of the reaction product of polyvinyl alcohol and an alkyl aldehyde in styrene is given by the following example and by reference to Figure 3 of the drawings.

Example 3

100 parts styrene
1 part polyvinyl butyral
1 part polyethylene glycol di-2-ethyl hexoate.

Referring to Figure 3, it will be seen that the processing occurred in about 30 minutes and may be suitably varied between 20 and 45 minutes at about 120° C. The liquid product obtained at the process end point, as shown in Figure 3, has a relatively low viscosity and represents the minimum obtainable by the process. Upon further polymerization the material is very hard and neither flexible nor deformable at room temperature. The completely polymerized product has the characteristic metallic ring of polystyrene when struck with a hard object, but is less susceptible to mechanical fracture under impact or during machining.

Reference to Figure 4 of the drawings and the following example is had for one of the homologues of this resin series, namely, polyvinyl acetal.

Example 4

100 parts styrene
10 parts polyvinyl acetal
10 parts polyethylene glycol di-2-ethyl hexoate.

This mixture may be processed conveniently at temperatures less than 120° C. because of the excellent solubility in styrene of the polyvinyl acetal with a lower viscosity when compared with polyvinyl butyral. Upon further polymerization after the process end point the resulting resin is a plasticized styrene compound which is, however, less resistant to impact shock than the styrene containing 10% polyvinyl butyral.

Other homologues of the series are given by the following examples.

Example 5

300 parts styrene
30 parts polyvinyl formal
40 parts polyethylene glycol di-2-ethyl hexoate.

The above formulation is more conveniently processed at 130° C. to increase the solubility of the polyvinyl resin in the styrene, and upon complete polymerization after the process end point gives a product which is quite soft and relatively tough.

Example 6

100 parts styrene
25 parts polyvinyl acetal
25 parts polyethylene glycol di-2-ethyl hexoate.

The completely polymerized product for this formulation is relatively soft and with less tensile strength than for the formulation under Example 2 with a high percentage of polyvinyl butyral.

Example 7

100 parts styrene
10 parts granular polyvinyl butyral
7 parts polyethylene glycol di-2-ethyl hexoate.

The above formulation may be processed as outlined in Example 1, and upon complete polymerization the product is harder and stiffer than that of Example 1.

Other examples of formulations containing varying percentages of polyvinyl butyral with respect to styrene and with respect to the plasticizing oil are as follows. The purposes upon final polymerization will vary in accordance with the amount of plasticizing oil used and the amount of reaction product between polyvinyl alcohol and alkyl aldehyde with respect to styrene.

Example 8

100 parts styrene
10 parts granular polyvinyl butyral
20 parts polyethylene glycol di-2-ethyl hexoate.

Example 9

100 parts styrene
18 parts granular polyvinyl butyral
36 parts polyethylene glycol di-2-ethyl hexoate.

Example 10

100 parts styrene
10 parts granular polyvinyl butyral
10 parts tri-ethylene glycol di-2-ethyl hexoate.

Example 11

100 parts styrene
10 parts granular polyvinyl butyral
10 parts tri-ethylene glycol di-2-ethyl butyrate.

Depending upon the kind of uses to which the partially polymerized mixtures resulting from any of the above treatments would be put it may be desirable to thicken the mixture by additional polymerization of the styrene monomer. This may be accomplished by continuing to mix and heat the mixture at the same or higher temperatures until the proper viscosity is reached, which may be carried to the point where the entire mass becomes a thermo-plastic solid.

In order to provide for a storage of any of the mixtures without further polymerization, the material resulting from the process outlined above may be treated with a small amount, from 60 to 300 parts per million, of conventional material known in the art as hydroquinone, catechol, or other easily oxidized polyhydric phenol.

The liquid material resulting from any of the above treatments is then ready for the application as a casting liquid or as an impregnating material or as a coating material (which may be mineral loaded), and may be further polymerized into a thermoplastic solid by further treatment with heat or other radiant energy known to the art.

While the invention has been described by means of a number of homologues which the invention may assume in practice it is not intended that the invention be limited by the examples described, nor otherwise than by the terms of the claims here appended.

I claim:

1. The process which comprises the steps of polymerizing styrene at a temperature between about 90° C. and about 145° C. in the presence of about 1 to 18 parts of the reaction product of polyvinyl alcohol and an alkyl aldehyde for each 100 parts of styrene and about 0.7 to 2 parts of a liquid plasticizer for each part of said reaction product, terminating the polymerization reaction at the point where the product contains partially polymerized styrene and is a homogeneous sirupy liquid at room temperature, and bringing the product to room temperature.

2. The process which comprises the steps of polymerizing styrene at a temperature between about 90° C. and about 145° C. in the presence of about 1 to 18 parts of the reaction product of polyvinyl alcohol and an alkyl aldehyde for each 100 parts of styrene and from about 0.7 to 2 parts of liquid polyethylene glycol di-2-ethyl hexoate, terminating the polymerization reaction at the point where the product contains partially polymerized styrene and is a homogeneous sirupy liquid when cooled to room temperature, and bringing the product to room temperature.

3. The process which comprises the steps of polymerizing styrene at a temperature between about 90° C. and about 145° C. in the presence of about 1 to 18 parts of polyvinyl butyral for each 100 parts of styrene and about 0.7 to 2 parts of liquid polyethylene glycol di-2-ethyl hexoate for each part of the polyvinyl butyral, terminating the polymerization reaction at the point where the product contains partially polymerized styrene and is a homogeneous sirupy liquid when cooled to room temperature, and bringing the product to room temperature.

4. The process which comprises the steps of polymerizing styrene at a temperature between about 90° C. and about 145° C. in the presence of about 1 to 18 parts of the reaction product of polyvinyl alcohol and an alkyl aldehyde for each 100 parts of styrene and about 0.7 to 2 parts of a liquid plasticizer for each part of said reaction product, terminating the polymerization reaction at the point where the product contains partially polymerized styrene and is a homogeneous sirupy liquid at room temperature, bringing the product to room temperature, and adding a polymerization inhibitor for the styrene.

5. The process which comprises the steps of polymerizing styrene at a temperature between about 90° C. and about 145° C. in the presence of about 1 to 18 parts of the reaction product of polyvinyl alcohol and an alkyl aldehyde for each 100 parts of styrene and about 0.7 to 2 parts of a liquid plasticizer for each part of said reaction product, terminating the polymerization reaction at the point where the product contains partially polymerized styrene and is a homogeneous sirupy liquid at room temperature, bringing the product to room temperature, and adding a polyhydric phenol inhibiting agent.

LEON DAVID COOK, Jr.

REFERENCES CITED

The following references are of record in the file of this patent:

UNITED STATES PATENTS

| Number | Name | Date |
|---|---|---|
| 1,975,959 | Lawson | Oct. 19, 1934 |
| 2,284,335 | Meyer | May 26, 1942 |
| 2,326,543 | Macht | Aug. 10, 1943 |
| 2,377,231 | Hayes | May 29, 1945 |